United States Patent [19]

Shen

[11] Patent Number: 5,383,294

[45] Date of Patent: Jan. 24, 1995

[54] VARIABLE NUMBER PLATE FIXING FRAME FOR VEHICLE

[75] Inventor: Shun T. Shen, Taipei Hsien, Taiwan, Prov. of China

[73] Assignee: Janchy Enterprise Co., Ltd., Taipei Hsien, Taiwan, Prov. of China

[21] Appl. No.: 120,801

[22] Filed: Sep. 15, 1993

[51] Int. Cl.6 ................................................ G09F 7/00
[52] U.S. Cl. ........................................ 40/209; 40/210
[58] Field of Search ................. 40/200, 209, 210, 152; 403/375

[56] References Cited

U.S. PATENT DOCUMENTS

| | | | |
|---|---|---|---|
| 2,192,561 | 3/1940 | Seeley | 40/209 |
| 2,869,261 | 1/1959 | Audette | 40/209 |
| 4,924,611 | 5/1990 | Shaw | 40/209 |

FOREIGN PATENT DOCUMENTS

| | | | |
|---|---|---|---|
| 0670223 | 5/1989 | Switzerland | 40/209 |
| 2214805 | 9/1989 | United Kingdom | 40/152 |

Primary Examiner—Edward K. Look
Assistant Examiner—Christopher Verdier
Attorney, Agent, or Firm—Browdy and Neimark

[57] ABSTRACT

A variable number plate fixing frame is provided with a pair of symmetric side brackets which are removably attached to a main frame body. A number of different spare side brackets are provided so as to permit a person to vary the appearance of the fixing frame for a change by simply replacing the side brackets with other ones without detaching the screw secured number plate. Each side bracket is provided with a tenon at each end thereof which is in tight engagement with a mortise disposed on each end of a receiving cavity disposed at the right and left side of the main frame body and having a shape conforming to that of the side brackets so that the brackets can be firmly and replaceably disposed therein. The upper and lower edges of the main frame body is provided with a recess in which different decoration stickers can be disposed just for a change in the appearance of the fixing frame.

1 Claim, 4 Drawing Sheets

VARIABLE NUMBER PLATE FIXING FRAME FOR VEHICLE

BACKGROUND OF THE INVENTION

The present invention relates to a variable number plate fixing frame particularly for use on a vehicle. The fixing frame is secured to the body of a vehicle by screws with two side brackets thereof removably attached to the main frame body rods by way of tenon and mortise joint, and a number plate of a vehicle is mounted to the fixing frame by way of the screws used to secure the frame to the vehicle. There are a plurality of various side brackets which-can be selected to engage with the main frame body so as to permit the fixing frame to vary in appearance.

Conventional number plates of vehicles are secured to the bodies of vehicles directly by screws or bolts and nuts without use of a fixing frame. But, recently many types of decorational fixing frame have been used, they are secured to the bodies of vehicles with the number plates mounted thereto. The fixing frames are not variable in their outer appearances, and must be detached and replaced when the users would like to have different ones for a change.

SUMMARY OF THE INVENTION

The primary object of the present invention is to provide a number plate fixing frame which is provided with a plurality of replaceable side brackets that can be readily attached to or detached from the main frame body for a change in appearance.

Another object of the present invention is to provide a number plate fixing frame which is easily mounted to or detached from a vehicle body.

DETAILED DESCRIPTION OF THE PREFERRED EMBODIMENT

Figure 1:
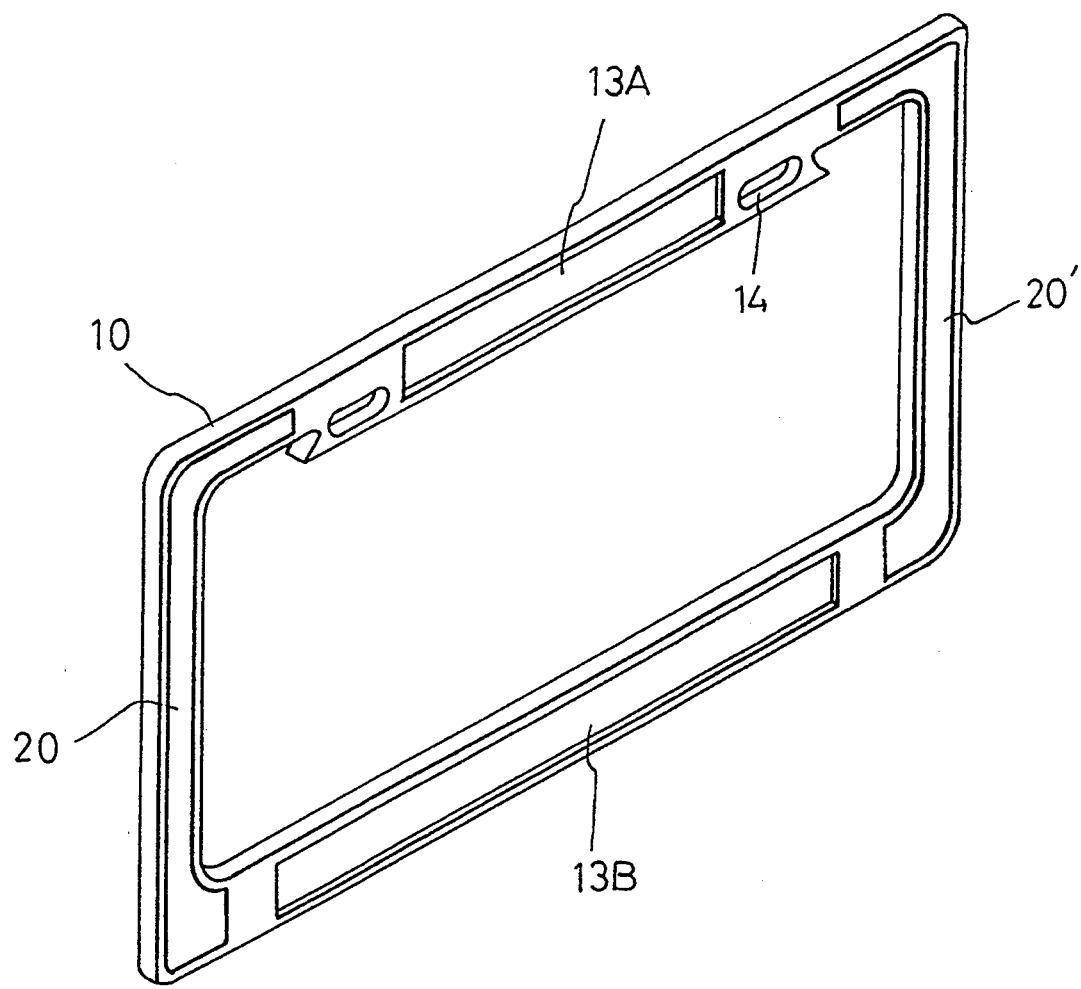
FIG. 1 is a diagram showing the fixing frame of the present invention.
Figures 2, 2A:
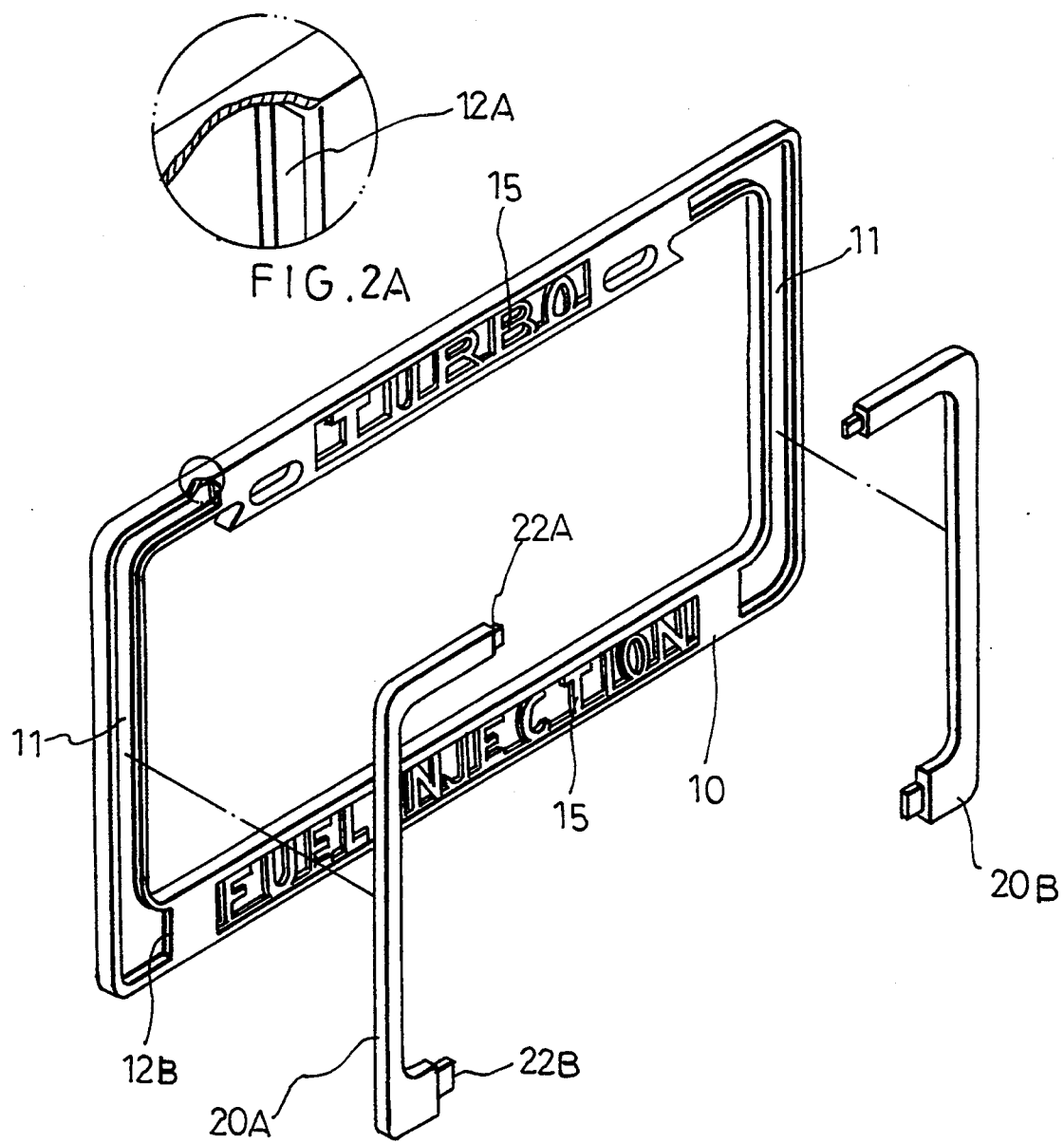
FIG. 2 is a diagram showing a pair of side brackets to be inserted into the cavities on each side of the main frame body.
FIG. 2A is an enlarged diagram showing the mortise of the main frame body of the present fixing frame.
Figure 3:
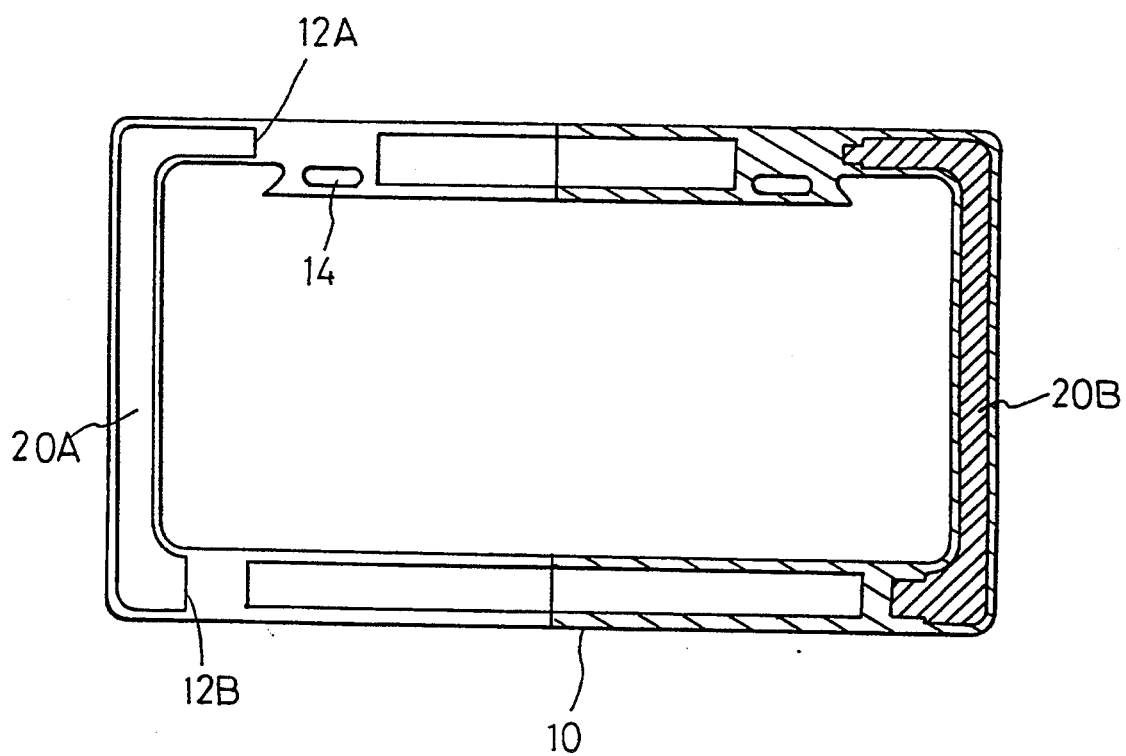
FIG. 3 is a diagram showing the assembled fixing frame of the present invention.
Figure 4:
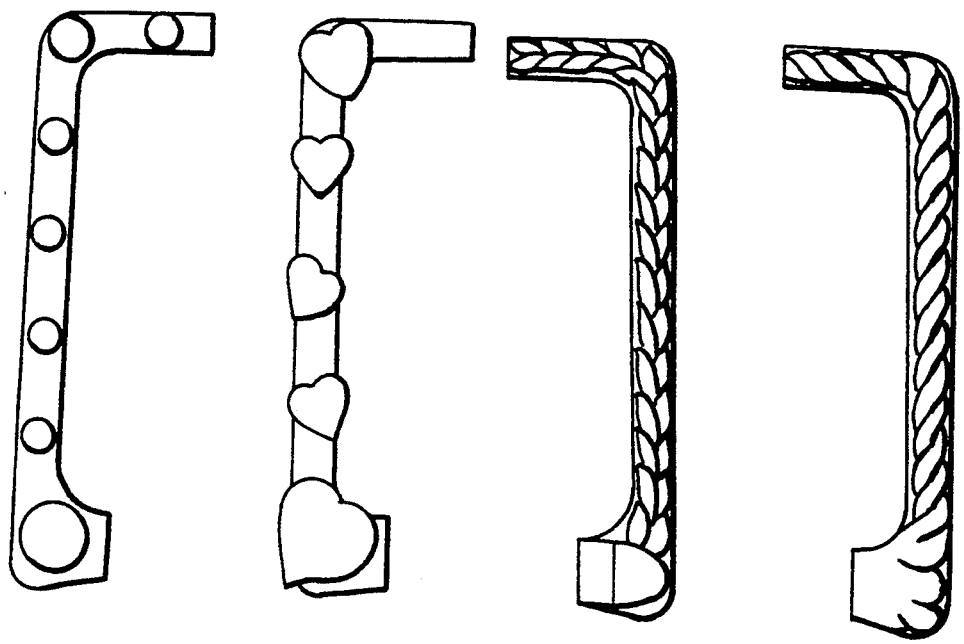
FIG. 4 is a diagram showing the different side brackets which can be selected and mounted to the fixing frame.

Referring to FIGS. 1, 2, the number plate fixing frame of the present invention is provided with a main frame body 10 and a pair of side brackets 20A, 20B. Each side of the frame body 10 is provided with a cavity 11 conforming to the shape of each side bracket respectively so that the same can be removably inserted therein. At the ends of the side brackets 20A, 20B are disposed an upper tenon 22A and a lower tenon 22B which are in firm engagement with the corresponding mortises 12A, 12B so that different side brackets 20A, 20B, as shown in FIG. 4 can be selected and firmly housed in the cavities 11.

Figure 5:
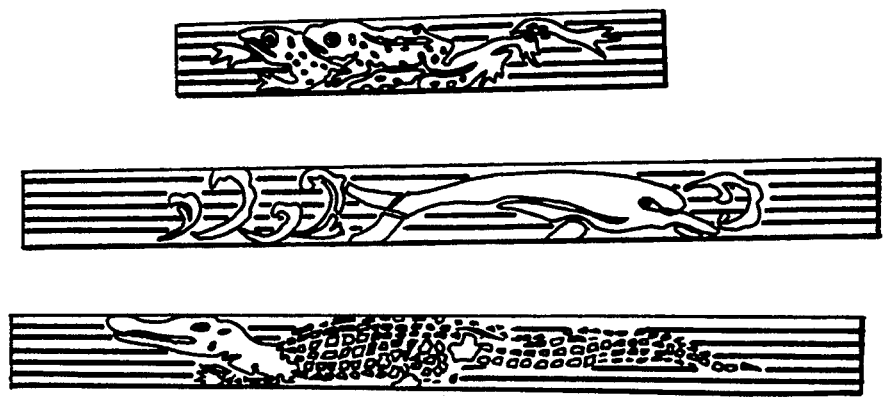
FIG. 5 is a diagram showing some various kinds of stickers used in the present invention.

On the upper and lower edges of the main frame body 10 are provided with an elongated recess 13 in which different decoration stickers 15, as shown in FIGS. 2, 5, can be removably mounted thereto whereby a person can vary the appearance of the number plate fixing frame as he or she likes.

It can be clearly seen that the present invention has a main frame body and a pair of replaceable side brackets which are firmly mounted in the cavities of the main frame body by way of tenon and mortise joint so as to permit a person to easily remove the side brackets just for a change in the appearance of the fixing frame. Moreover, the recesses on the upper and lower edges of the main frame body permits a person to further decorate the fixing frame with artistic stickers with ease without detachment of the same. The use of tenon and mortise joint in cooperation with the receiving cavities makes the mounting of the side brackets securely firm without shaking and loosening.

I claim:

1. A number plate fixing frame for use on a vehicle, comprising:
   a main frame body;
   a plurality of side brackets two of which can be selected to associate with said main frame body;
   said main frame body having at the right and left side thereof respectively a receiving cavity matching with a shape of each said side bracket so as to permit each said side bracket to be located therein;
   each said side bracket having a tenon at each end thereof;
   each said cavity having a mortise at each end thereof in correspondence to each said tenon of said side brackets so that said side brackets are located in said cavities with said tenons firmly engaged with said mortises as said side brackets are located in said cavities;
   a recess being disposed at the upper and lower edges of said main frame body for mounting of decoration stickers.

* * * * *